United States Patent [19]

Scholl et al.

[11] Patent Number: 4,699,529
[45] Date of Patent: Oct. 13, 1987

[54] RADIAL ROLLER BEARING

[75] Inventors: Herbert Scholl, Schweinfurt; Uwe Brockmuller, Oberwerrn, both of Fed. Rep. of Germany

[73] Assignee: SKF GmbH, Schweinfurt, Fed. Rep. of Germany

[21] Appl. No.: 890,005

[22] Filed: Jul. 24, 1986

[30] Foreign Application Priority Data

Jul. 27, 1985 [DE] Fed. Rep. of Germany ....... 3527033

[51] Int. Cl.$^4$ .................. F16C 43/06; F16C 33/76; F16C 33/46
[52] U.S. Cl. .................. 384/560; 384/484; 384/501; 384/564; 384/572
[58] Field of Search ............ 384/470, 477, 484, 486, 384/507, 509, 513, 515, 523–534, 560, 561, 564, 571, 572–580

[56] References Cited

U.S. PATENT DOCUMENTS

| 1,404,939 | 1/1922 | Dohner et al. | 384/561 |
| 2,747,951 | 5/1956 | Wallgren | 384/564 |
| 2,969,266 | 1/1961 | Schaeffler | 384/564 |
| 3,552,814 | 1/1971 | Altson et al. | 384/574 |
| 3,694,043 | 9/1972 | Tellson | 384/578 |
| 3,767,278 | 10/1973 | Knowles | 384/575 |
| 3,975,066 | 8/1976 | Hofmann et al. | 384/526 |
| 4,136,916 | 1/1979 | Musselman et al. | 384/560 |
| 4,435,024 | 3/1984 | Tagawa et al. | 384/576 |
| 4,523,862 | 6/1985 | Yasui et al. | 384/572 X |

FOREIGN PATENT DOCUMENTS

| 1286343 | 1/1969 | Fed. Rep. of Germany | 384/564 |
| 2753340 | 5/1979 | Fed. Rep. of Germany | 384/486 |
| 3115779 | 11/1982 | Fed. Rep. of Germany | 384/574 |
| 133731 | 11/1951 | Sweden | 384/572 |

Primary Examiner—Stuart S. Levy
Assistant Examiner—Thomas R. Hannon
Attorney, Agent, or Firm—Eugene E. Renz, Jr.

[57] ABSTRACT

A roller bearing assembly comprising inner and outer rings having an annular space therebetween, a plurality of rolling elements in the annular space, a cage for guiding the rolling elements, a retaining element mounted on one of the rings and having flexible projections to snap fit with complementary surfaces of the cage whereby the one ring is connected through the cage to the retaining element.

3 Claims, 5 Drawing Figures

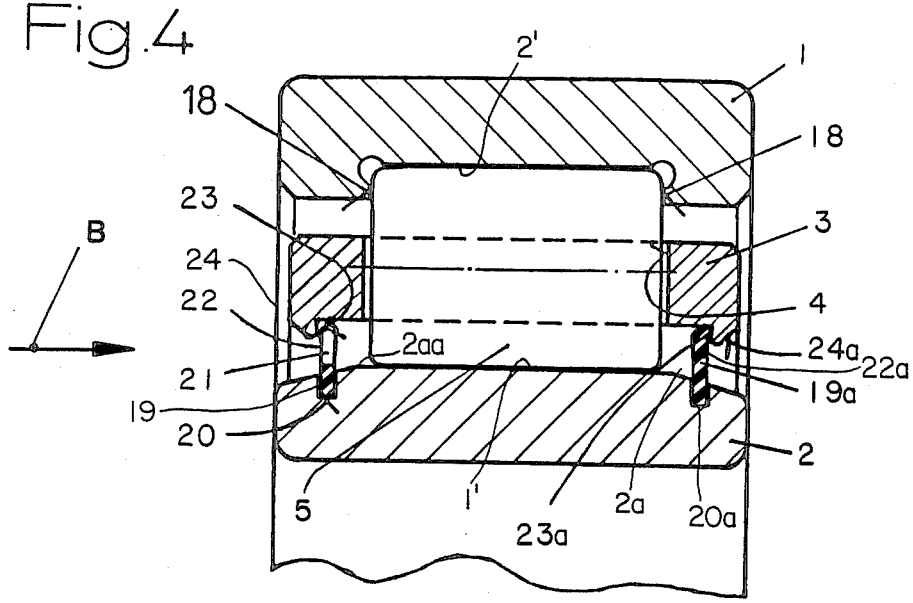
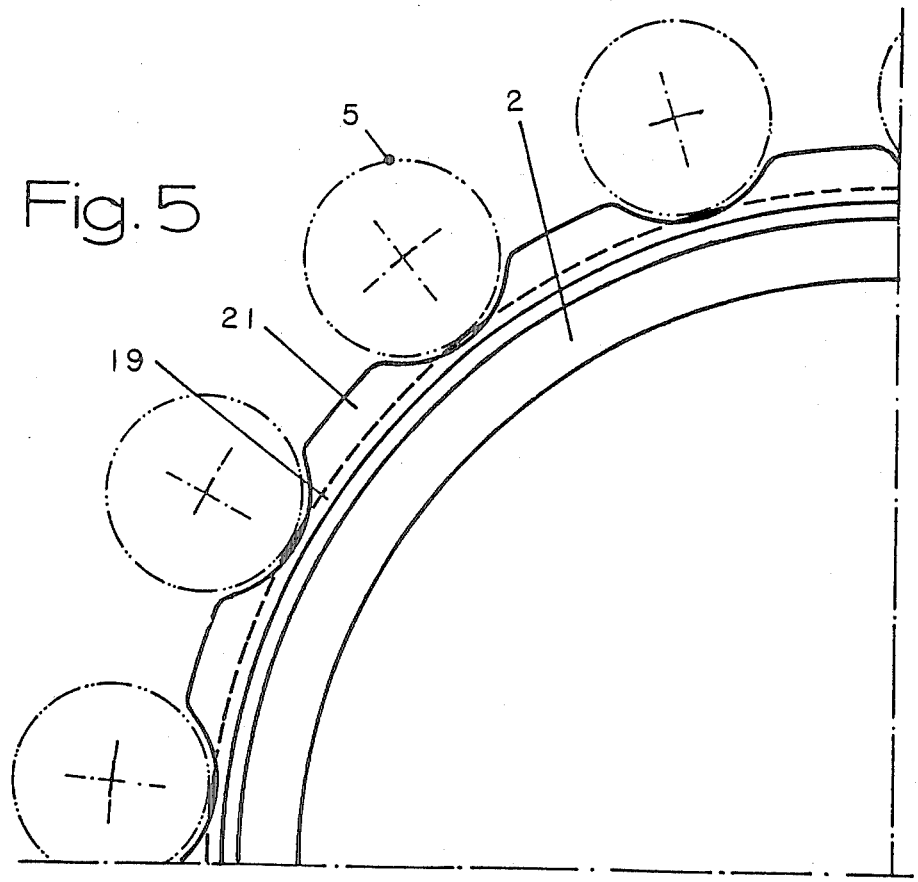

RADIAL ROLLER BEARING

FIELD OF THE INVENTION

The present invention relates to roller bearings and more specifically to a novel means for mounting and supporting the cage in place in a rolling bearing assembly.

BACKGROUND OF THE INVENTION

West German Offenlegungsschrift No. 2,739,367 shows a radial roller bearing assembly having a cage with elastically deformable projections which snap into place behind side surfaces in the bore of the lateral surface of the inner ring formed by grooves or the like. In this manner, the cage is held laterally in place against projections on either the outer or the inner ring. A disadvantage of this type of cage is that it must be made of a relatively soft, deformable material and in many instances, it is necessary to utilize a special manufacturing process which increases the time and expense to manufacture cages of this type.

The aim of the present invention, therefore, is to provide a roller bearing of this general type wherein the cage can be made relatively easy and economically from a relatively hard and stiff material and yet provide the advantages of snap connections between the cage and the retaining element of the outer or inner ring. Cages made of a hard, wear-resistant material are advantageous since they present hard, wear-resistant pocket surfaces against which the rolling elements engage for better accuracy and longer life. The present invention provides a solution to this problem by means of a retaining element which has the necessary flexibility and compressibility characteristics so that it can be snap fitted to the cage and mounted in place in either the inner or outer ring, for example by a press fit. This arrangement facilitates easy assembly of the bearing simply by snapping the projections of the retaining element in the complementary surface of the cage.

The retainer assembly is particularly advantageous in radial roller bearings equipped with conical rollers or cylindrical rollers which are devoid of a retaining flange for the rolling elements on one of the two bearing rings. The retaining projections, therefore, retain the flangeless outer or inner ring provided with a retaining element laterally in place on the cage so that it can be easily pulled out to one side or the other. The flangeless outer or inner ring can be pulled out and removed only by overcoming the bending or compressive elastic forces of the projections of the retaining element.

The cage for a radial roller bearing in accordance with the present invention can be made economically from a rigid, hard material such as sintered materials. The rolling elements are then guided on hard, wear-resistant surfaces of the cage pockets whereby the rolling elements run extremely accurately even when the radial roller bearing is under high load. It has also been found that this arrangement extends the service life of the bearing considerably.

In accordance with still another feature of the present invention, the side surfaces of the cage are formed by two opposing side walls of a ring-shaped groove machined into the lateral surface or the bore surface of the cage.

This facilitates production since milling a ring-shaped groove into the lateral surface of the cage or in the bore surface of the cage is a relatively simple and easy process. In the event that the two side walls of the ring-shaped groove are close to the opposite projections of the retaining element, the inner or outer ring of the unassembled radial roller bearing connected to the retaining element can be pulled apart toward either side. In accordance with another feature of the present invention, the side surfaces of the cage are formed by ledges or shoulders of a circumferential step machined into the bore surface or lateral surface of the cage. By this arrangement, one or both sides of the radial roller bearing are held on a shoulder surface of a step machined into the cage.

In accordance with still another feature of the present invention, the projections of the retaining element are configured to facilitate radial engagement between the shoulder surface of the cage and the axial end surfaces of the rolling elements. By this arrangement, the inner or outer ring of the unassembled radial roller bearing connected to the retaining element is held in place on the cage on both sides.

BRIEF DESCRIPTION OF THE DRAWINGS

These and other objects of the present invention and the various features and details of the operation and construction thereof are hereinafter more fully set forth with reference to the accompanying drawings, wherein:

FIG. 4 is a partial longitudinal sectional view similar to FIG. 3 still a further modified form of radial roller bearing in accordance with the present invention; and FIG. 5 is a partial side elevational view taken in the direction of arrow B in FIG. 4 showing the inner ring before it is assembled with the associated outer ring.

DESCRIPTION OF THE PREFERRED EMBODIMENTS

Figure 1:
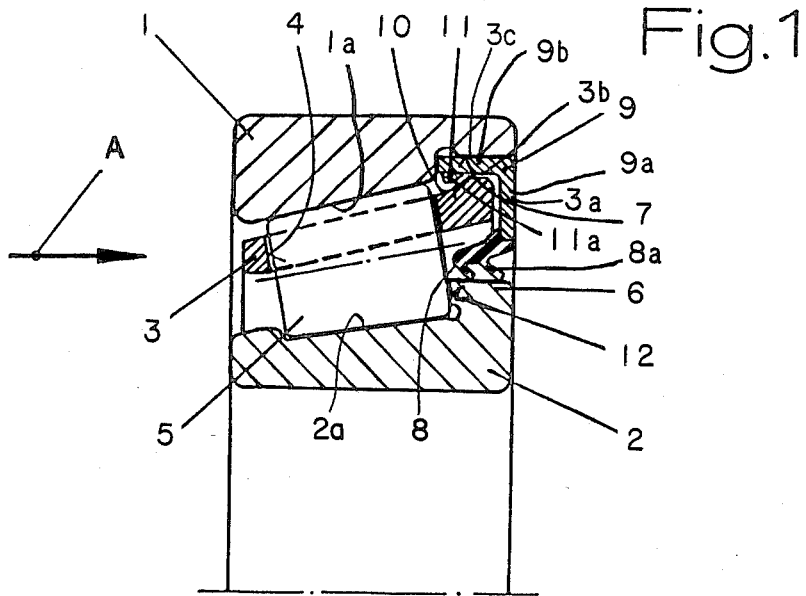
FIG. 1 is a partial longitudinal sectional view through a radial roller bearing with a sealing ring in accordance with the present invention.

Referring now to the drawings and particularly FIG. 1 thereof, there is illustrated an embodiment of rolling bearing in accordance with the present invention. The bearing illustrated is a conical roller bearing and comprises spaced outer and inner rings 1 and 2, respectively, and an annular ring-shaped cage 3 mounted in the annular space between the rings. The cage includes a plurality of circumferentially spaced pockets 4 for rolling elements 5 which, in the present instance, are conical rollers. In the present instance, the inner and outer rings have conical raceways 1a and 2a, respectively, and as illustrated, the inner raceway has a guide flange 6 adjacent one axial end thereof which is the large diameter side of the rolling elements 5. Note that the rolling elements 5 run laterally against this flange and thus, the flange 6 provides a guide function. The outer ring 1 has a cylindrical recess in its bore spaced inwardly from one axial end face of the ring adjacent the large diameter end of the rollers which supports a sealing ring 8. In the present instance the sealing ring 8 includes a flexible, resilient portion having sealing lips 8a which engage the surface 6 and a metallic reinforcing ring 9 of generally L-shaped cross-section having a radially inwardly directed shank portion 9a which carries the sealing ring 8 and axially, inwardly directed shank portion 9b is firmly seated in the cylindrical recess 7 of the outer ring by a press fit.

Figure 2:
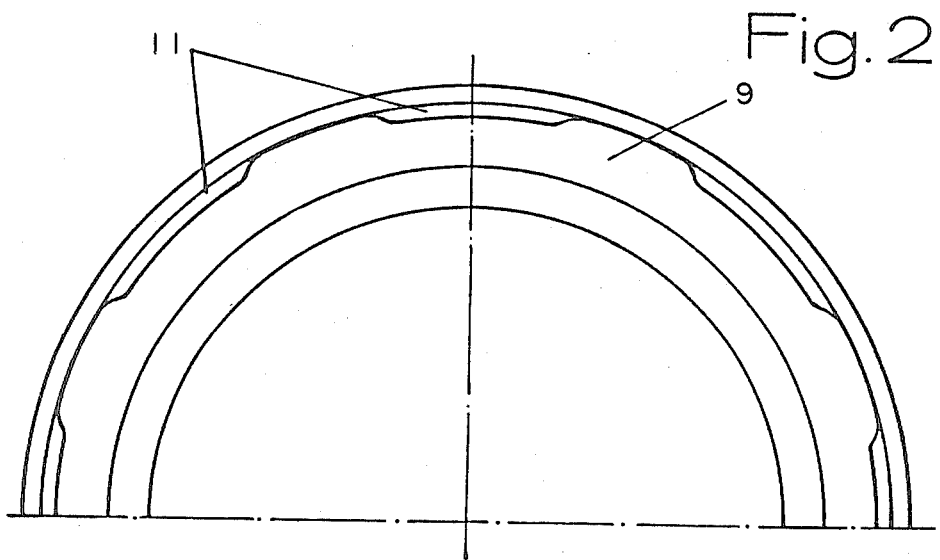
FIG. 2 is a partial side elevational view taken in the direction of arrow A of FIG. 1 showing the sealing ring in the unassembled state.

The cage 3 has an end surface 3a which faces the radially inwardly directed shank 9a and which is guided laterally toward the outside on the shank 9a in a sliding manner. The cage also has a cylindrical, lateral surface section 3b adjoining the end surface 3a which is guided in the bore of the axial shank 9b of the reinforcing ring 9 with predetermined small amount of radial play. The cage is formed with a circumferential step 3c on the axially inner end of the lateral surface section which reduces the diameter of its lateral surface and defines an axially inwardly directed conical shoulder surface 10. The reinforcing ring 9 serves as a retaining element and as best illustrated in FIG. 2, has a series of inwardly directed projections 11 which are disposed laterally opposite the conical shoulder 10 of cage 3. The projections 11 which are preferably made of a flexible and/or compressible rubber are vulcanized onto the bore surface of the axially inwardly directed shank 9b of reinforcing ring 9. The projections 11 are shaped like sections of rings and are distributed uniformly around the circumference of the shank in the manner illustrated in FIG. 2.

Consider now in more specific detail the other details of the reinforcing ring 9 and specifically the projection 11. The projections 11 are formed with axially outwardly directed side surfaces 11a disposed closely adjacent opposing shoulder surface 10 of cage 3 and conform to the conicity of the shoulder surface 10. Side surfaces 11 have a slight convexity in the circumferential direction so that upon rotation of the cage, shoulder surface 10 contacts side surfaces 11a of the projections 11 producing a load-bearing, hydrodynamic lubricating wedge of lubricant in the contact zone. The large axial end face 12 of each rolling element 5 is located closely to opposing projections 11 which engage radially between side surface 10 of cage 3 and the end surfaces 12. By this arrangement, the outer ring 1 is held in place on both sides by way of sealing ring 8 with a slight degree of axial play.

Considering now assembly of a radial roller bearing, first the inner ring 2, cage 3 and rolling elements 5 are assembled in the usual manner. Then sealing ring 8 is placed against the large diameter axial end 12 of the rolling elements and pushed under elastic deformation of projections 11 over the cylindrical, lateral surface section 3b of cage 3 until projections 11 snap in place behind shoulder surface 10 of cage 3. The assembly is completed by pressing outer ring on from the opposite side, i.e. in the direction of arrow A in FIG. 1 so that recess 7 is pushed on to lateral surface of the axially inwardly directed shank 9a of reinforcing ring 9. Opposing force is thus exerted from the outside on the radially inwardly directed shank 9a of reinforcing ring 9. The assembled radial roller bearing now forms a self-contained unit.

Figure 3:
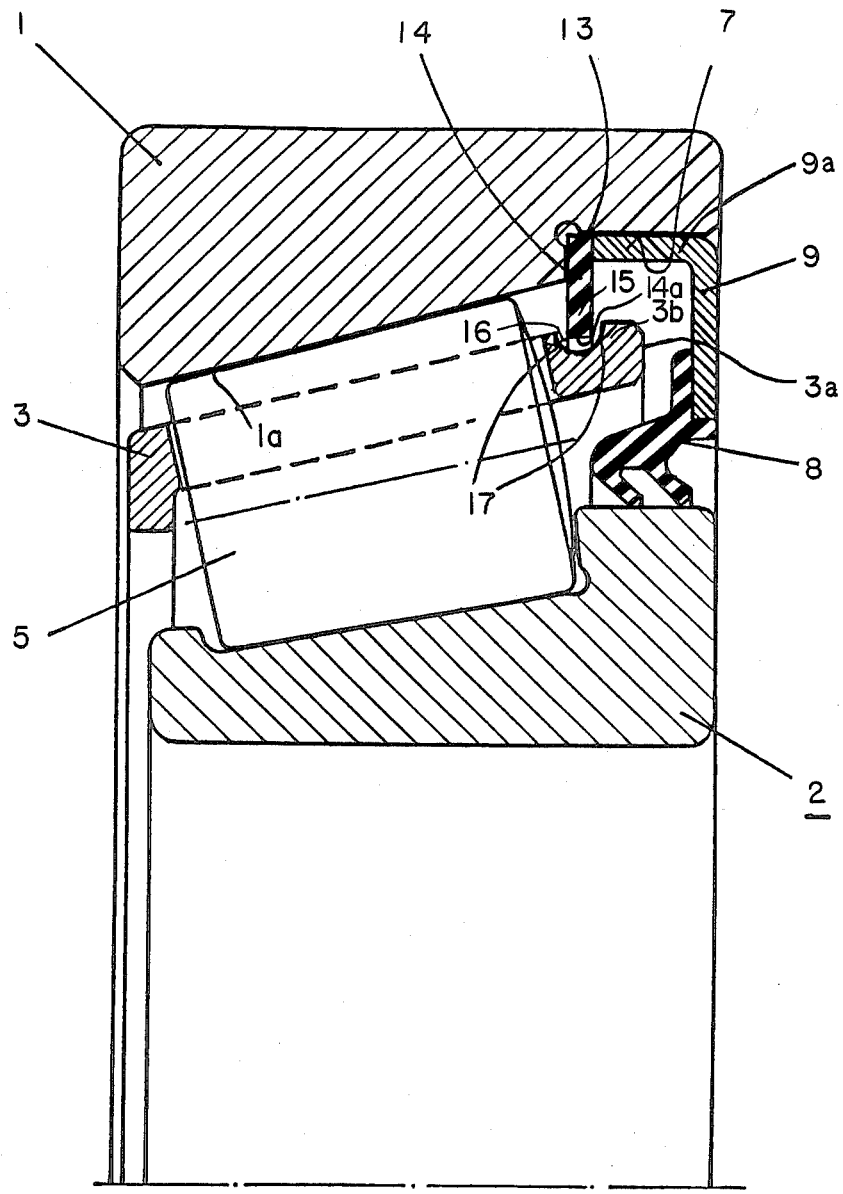
FIG. 3 is a partial longitudinal sectional view through a modified form of a radial roller bearing in accordance with the present invention.

FIG. 3 shows another embodiment of radial roller bearing in accordance with the present invention. The radial roller bearing is generally similar to that previously described and common parts are designated by the same reference numerals. Thus the bearing assembly includes an outer ring 1, an inner ring 2, a plurality of conical roller elements 5 guided in a series of circumferentially spaced pockets of cage 3. A sealing ring 9 located adjacent the large diameter end of the rolling elements 5 firmly seats in a cylindrical recess 7 in the bore 1a of the outer ring 1.

In accordance with this embodiment of the invention, a disk-shaped retaining element 14 made of an elastomeric plastic material is provided which is firmly clamped between a shoulder 13 in the bore 1a of the outer ring and the axially inwardly directed shank portion 9a of reinforcing ring 9. The radially inwardly directed free section 14a of the retaining element 15 engages in a ringshaped groove 16 in the lateral surface 3b of cage 3. Ring-shaped groove 16 has two circumferentially extending side walls 17 which are located laterally opposite projection 15 of retaining element 14. Accordingly, during operation of the bearing, the portions of the side walls 17 which confront the projection 15 of retaining element 14 slide on these surfaces and this produces bending stresses in the projection so that the cage 3 is, at least temporarily, pushed laterally by the elastic force of the retaining element 14 and thus, turns in the roller bearing without lateral play.

This embodiment of roller bearing is assembled in much the same manner as that described previously. In that process when the reinforcing ring is assembled, projection 15 snaps behind one of the two side walls 17 of ring-shaped groove 16.

There is illustrated in FIGS. 4 and 5 another embodiment of roller bearing assembly in accordance with the present invention where again the common parts are designated by the same reference numeral. Thus this assembly includes an outer ring 1 having in the present instance a cylindrical outer raceway 1a and an inner ring 2 with a cylindrical inner raceway 2a. However, in this instance the bearing assembly is a cylindrical roller bearing rather than a conical roller bearing assembly. Thus, the assembly comprises inner and outer rings 1 and 2 having cylindrical inner and outer raceways 1' and 2', respectively. The assembly further includes a plurality of cylindrical rolling elements 5 which are guided in pockets 4 of a ring-shaped cage 3. In the present instance the outer ring has guide flanges 18 on opposite sides of the outer raceway 1' which, in the present instance, are formed integrally with the outer ring.

In accordance with this embodiment of the invention, retaining elements 19, 19a are provided on both axial ends of the cage 3 which are rigidly connected to the inner ring 2. The retaining elements 19, 19a are preferably made of an elastic material in the form of a ring-shaped disk which snap in a positively locking manner into a ring-shaped grooves 20, 20a in the lateral surface 2a of the inner ring 2. The retaining rings 19, 19a have a series of radial projections 21, 21a which are uniformly distributed about the periphery. The radial projections have outwardly directed contact surfaces 22, 22a engaging without play an axially, inwardly directed shoulder surface 23, 23a of a stepped portion 24, 24a of cage 3. Note that the number of projections 21 is equal to the number of rolling elements in the bearing.

Considering now assembly of the roller bearing described, first the outer ring 1 and cage 3 are assembled in a known manner to form a self-contained unit. The retaining elements 19 are then snapped into their ring-shaped grooves 20 in the inner ring. The inner ring is then rotated to some extent relative to the cage so that each rolling element comes to rest between two adjacent projections 21 of the retaining element 19 and then snapped into place on the installation side. The inner ring 2 is then pushed axially underneath the rolling elements 3, for example, from right to left as viewed in FIG. 4 in a direction opposite the direction of arrow B. Projections 21 of retaining element 19 on the installation side thus come to rest against the conical slanted surface 24a of the inner edge of cage 3 and are bent axially inwardly or to the right. As the inner ring is pushed further inward from right to left, projections 21 snap behind the shoulder surface 23a of cage 3. Finally, the retaining element 19a on the other side designated the removal side of the inner ring 2 contacts slanted surface 24a and is also bent axially outwardly and finally snaps behind the installation side shoulder surface 23a of cage 3. As this is happening the installation side retaining element 19 is bent slightly inwardly without its shoulder surface 22 snapping outwards in front of the removal side slanted surface 24 of cage 3. Cage 3 is now guided by the axially outwardly directed contact surface 22 of the two retaining elements on inner ring 2 and thus held laterally in place.

During operation, projections 21, 21a of the retaining elements 19, 19a absorbs small axial loads. Sliding contact surface 22, 22a of retaining elements 19, 19a transmits small axial loads from the inner ring 2 via cage 3 and rolling elements 5 to the associated guide flange 18 of the outer ring. A sealing effect is also created which precludes intrusion of dirt and foreign matter between the cage 3 and inner ring into the radial roller bearing.

Even though particular embodiments of the present invention have been illustrated and described herein, it is not intended to limit the invention and changes and modifications may be made therein within the scope of the following claims. For example, even though the invention is illustrated in connection with single-row bearings, the invention applies equally to radial roller bearings having more than one row of rolling elements. In this regard, if desired, each row of rolling elements can be installed in a separate pocket cage. Further, at least one of the cages of the multi-row radial bearing in this case has a wide surface which is set up to cooperate with elastic projections of a retaining element rigidly connected to the outer or inner ring.

SUMMARY OF THE INVENTION

The radial roller bearing consists of an outer ring (1), an inner ring (2), and, revolving between these rings, rolling elements (5) installed in the pockets (4) of a ring-shaped cage (3). On one or both sides of the cage (3) there is a retaining element (9) rigidly connected to the outer or inner ring (1,2), this element having one or more radial projections (11) on its circumference. The projection(s) (11) is/are opposite a side surface (10) of the cage (3) on one or both sides.

So that the cage (3) of the radial roller bearing can be easily made from a rigid material in spite of the snap connection between cage (3) and retaining element (9), the projection(s) (11) of retaining element (9) is/are designed to have bending or compressive elasticity so that they can snap into place behind the side surface(s) (10) of the cage (3).

What is claimed is:

1. A roller bearing assembly comprising inner and outer rings having an annular space therebetween, a plurality of rolling elements in the annular space, a cage made of a hard and stiff material for guiding the rolling elements, a retaining element mounted on one of the rings comprising a rigid, reinforcing ring mounting a flexible seal which engages the other ring, at least one flexible projection projecting from the rigid reinforcing ring engageable at its terminal free end in a groove in the cage, said flexible projection snap fitting with complementary surfaces of the cage in the form of the circumferential radial groove whereby the one ring is connected through the cage to the retaining element and the cage is axially held by the fixedly mounted retaining element.

2. A roller bearing assembly comprising inner and outer rings having an annular space therebetween, a plurality of rollers in the annular space, a cage made of a hard and stiff material for guiding the rollers, retaining means mounted on one of the rings comprising ring-shaped disk elements made of an elastic material which snap fit in axial grooves in the inner ring on opposite sides of the row of rollers, each disk having a series of radial projections uniformly distributed around the periphery having outwardly directed contact surfaces engaging without play an axially, inwardly directed shoulder surface of a stepped portion of the cage.

3. A roller bearing assembly comprising inner and outer rings having an annular space therebetween, a plurality of rolling elements in the annular space, a cage made of a hard and stiff material for guiding the rolling elements, a retaining element mounted on one of the rings comprising a rigid, reinforcing ring of inverted L-shaped cross section press fitted in the outer ring at one end of the annular space a flexible seal made of a resilient elastomeric material projecting from the radial leg of said reinforcing engaging the other ring, a disk shaped retaining element made of an elastomeric plastic material firmly clamped between the axial leg of the reinforcing ring and a shoulder in the bore of the outer ring engageable at its terminal free end in a groove in the cage, said flexible projection snap fitting with complementary surfaces of the cage in the form of the circumferential radial groove whereby the one ring is connected through the cage to the retaining element and the cage is axially held by the fixedly mounted retaining element.

* * * * *